United States Patent Office 3,003,830
Patented Oct. 10, 1961

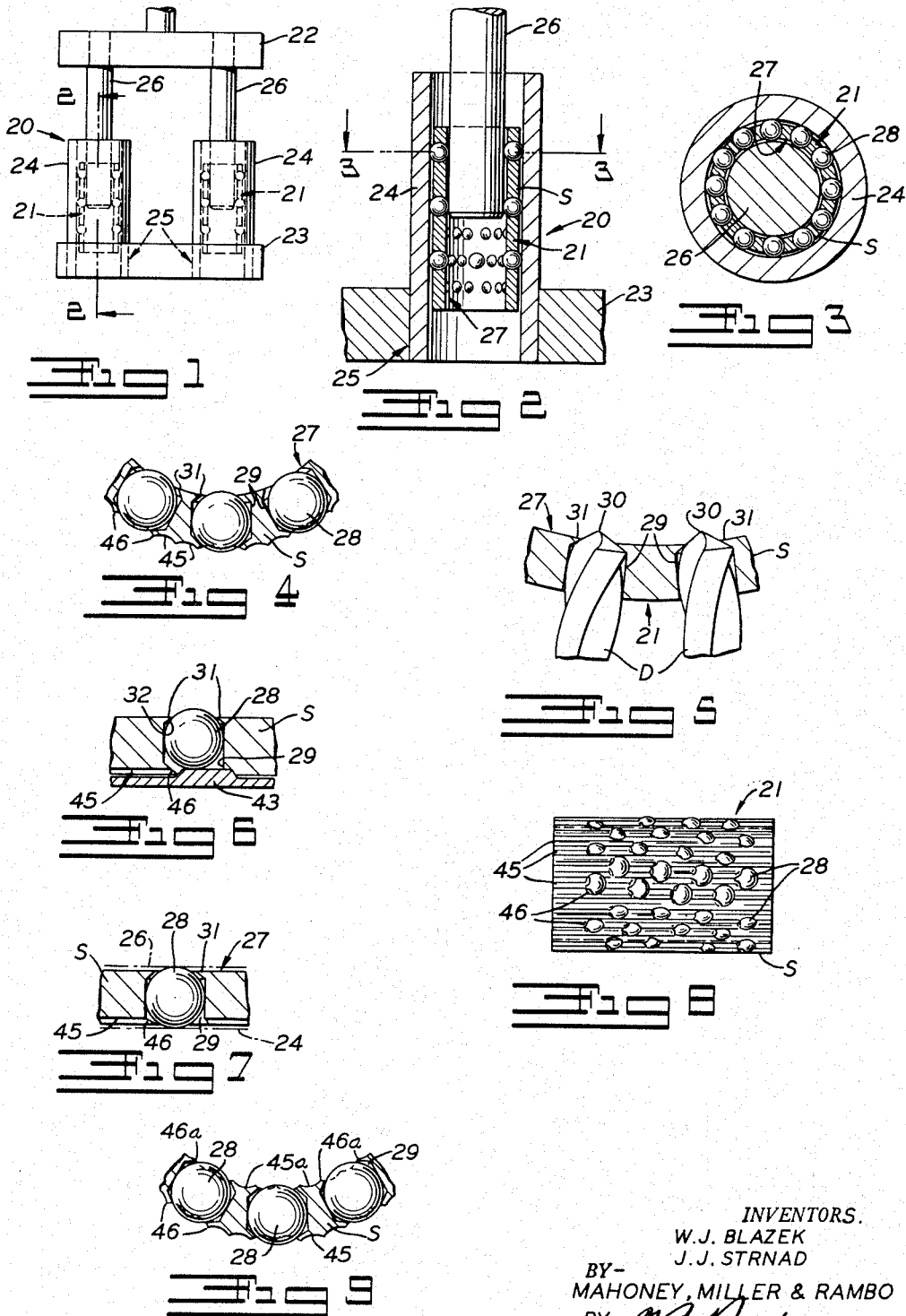

3,003,830
TUBULAR-TYPE ANTIFRICTION BEARING ASSEMBLIES
William J. Blazek, New Lexington, and James J. Strnad, Bedford, Ohio, assignors to Lempco Products, Inc., Bedford, Ohio, a corporation of Ohio
Original application Nov. 8, 1955, Ser. No. 545,696, now Patent No. 2,897,582, dated Aug. 4, 1959. Divided and this application May 15, 1959, Ser. No. 813,575
2 Claims. (Cl. 308—6)

The present invention relates generally to antifriction bearings, and more particularly to an improved antifriction-type bearing assembly including a tubular retainer having a multiplicity of relatively spaced antifriction bearing elements rotatably carried therein and arranged to project outwardly from the opposite inner and outer wall surfaces of the retainer for simultaneous rolling contact with adjacent surfaces of two relatively movable members.

This application is a division of our prior copending application for U.S. Letters Patent Serial No. 545,696, filed November 8, 1955, entitled Method of Producing a Ball Bearing Assembly, now U.S. Patent No. 2,897,582 issued August 4, 1959.

In the past, antifriction bearing assemblies of the type which included a tubular retainer and a multiplicity of relatively spaced antifriction bearing elements rotatably supported by the wall structure of the retainer and arranged to project outwardly beyond the inner and outer side walls thereof, have been relatively difficult and expensive to fabricate, due, primarily, to the means employed to retain the individual bearing elements against radial removal from the retainer sleeve. Such means ordinarily included the formation of annular shoulders or ring-like abutments upon the inner and outer wall surfaces of the retainer sleeve so arranged as to rotatably confine the associated bearing elements within the retainer sleeve against withdrawal radially therefrom. In such prior bearing constructions, the retainer sleeve was formed from metal, and was drilled radially to provide a multiplicity of relatively spaced ball or bearing-receiving openings into which individual ball elements were deposited, and thereafter, one or more of the ends of the ball-receiving openings of the retainer sleeve were individually peened or staked so as to form an annular flange or abutment extending partially across one or more of the ends of the ball-receiving openings of the sleeve, which abutments served to partially close the ball-receiving openings, and thereby retain the bearing elements against removal from such openings. As will be readily understood, such prior bearing assemblies were extremely difficult and expensive to manufacture, due to the necessity of individually staking the retainer adjacent each of the bearing-receiving openings formed therein.

Accordingly, it is the primary object of the present invention to provide an improved tubular-type antfriction bearing assembly whose construction eliminates the necessity for the individual peening or staking of the tubular retainer element so as to lock the bearing elements rotatably therein.

Another object of this invention is to provide a tubular-type ball bearing assembly which incorporates a tubular bearing retainer having a multiplicity of relatively spaced bearing-receiving openings therein, and formed on one or more sides thereof with a multiplicity of relatively closely spaced, parallel grooves or striae disposed in intersecting relationship to the individual bearing-receiving openings of the retainer, and which provide, in their formation, an integral, fin or flange-like projection or abutment extending partially across the bearing-receiving openings in a manner to rotatably retain the associated bearing elements within said openings, while at the same time permitting free rotation of the bearing elements within the openings of the retainer as well as limited radial movement of the bearing elements relative to the retainer.

For a further and more complete understanding of the present invention and the additional objects and advantages ambient thereto, reference is made to the following description and accompanying drawings, wherein:

FIG. 1 is a small scale elevational view of a die set embodying antifriction bearing assemblies formed in accordance with the present invention;

FIG. 2 is an enlarged vertical sectional view taken along the line 2—2 of FIG. 1 and illustrating the present bearing assembly in operative relation to the relatively movable pin and bushing components of a die set;

FIG. 3 is a horizontal sectional view taken along the line 3—3 of FIG. 2;

FIG. 4 is an enlarged fragmentary horizontal sectional view showing in detail the wall construction of the retainer element of the present bearing assembly;

FIG. 5 is a diagrammatic sectional view illustrating the initial step of drilling a tubular retainer partially through so as to form ball-receiving openings therein having retaining shoulders at one end of such openings;

FIG. 6 is a similar view illustrating the formation of the continuous longitudinally extending grooves or striae in the outer wall surface of the retainer;

FIG. 7 is a similar view illustrating the relative position of a ball element within the retainer when the ball element occupies a central position within an associated opening of the retainer sleeve;

FIG. 8 is an elevational view looking toward the outer surface of the retainer sleeve and illustrating particularly the fin-like flanges or abutments formed at the intersection of the parallel striae and the outer ends of the ball-receiving openings; and FIG. 9 is an enlarged fragmentary horizontal sectional view showing a segment of a modified type of bearing assembly formed in accordance with the present invention, and wherein both the inner, as well as the outer, wall surfaces of the retainer element are formed with grooves or striae producing the desired fin-like ball-retaining abutments.

Referring now to the drawings, there has been illustrated in FIGS. 1–3 thereof, a die set 20. This device is exemplary of one of many such devices in which the ball bearing assemblies 21 of the present invention may be usefully applied. Therefore, the specific die set illustrated is to be considered merely as a means for facilitating an understanding of our specific use of the invention, and not by way of limitation thereof.

As here shown, the die set comprises the customary upper and lower punch and die-supporting shoes or plates 22 and 23, respectively, which are adapted for attachment to the traveling platen or slide and the bed or bolster, respectively, of a conventional punch press, not shown. The base plate 23 is provided with a pair of guide bushings 24. The lower end of each of these bushings is preferably press-fitted in a bore 25 formed in the plate 23, and by which each bushing is maintained in a stationary upright position. The inner surfaces of these bushings are formed to present smooth bores for the telescopic reception of the bearing assemblies 21 and of the pins or posts 26 which are carried by and depend in rigid, transversely spaced order from the upper plate 22 of the die set.

Ball elements 28 are disposed in spaced radial openings 29 which extend through the solid cylindrical wall of each retainer S. Each of the ball elements possesses a greater diameter than the thickness of the wall of the retainer, but slightly less than the diameter of the opening 29 in which it is mounted, so that opposite spherical segments on each of the ball elements will extend outwardly from both the inner and outer wall surfaces of the retainer and will thus be disposed in direct, antifriction, rolling engagement with the outer surfaces of the posts 26 and the inner surfaces of the bushings 24. It will be understood that the ball elements 28, and the retainer S in which they are mounted, do not extend the full length of each of the bushings 24. This is due to the fact that the ball elements and the retainer therefor travel vertically about one-half the distance of the movement of the associated posts. Thus, the upper and lower parts of the die set may be maintained in perfect alignment, since any tendency toward relative lateral movement between the posts 26 and bushings 24 is prevented due to the preloaded interposition of the sleeve-retained ball elements between the posts and bushings.

The present invention is concerned primarily with the construction of the tubular antifriction bearing assemblies 21. As previously stated, it has been a common practice in the past to perform manually and individually the operations of depositing the ball elements 28 in the retainer openings 29, and thereafter to individually peen or stake the walls of the retainer sleeve adjacent the ball-receiving openings so as to displace a portion of the material of the retainer inwardly around the ends of the openings to hold the ball elements against radial removal through the ends of the openings.

To improve upon such prior art constructions, in accordance with the present invention, as shown in FIG. 5, a tubular retainer S, of given length, is ordinarily placed in a gang-type drilling machine containing a plurality of radially movable, power-rotated, drill bits D. With the retainer positioned in the center of such a drilling assembly, the rotating drill bits are advanced inwardly and radially of the stationarily held retainer sleeve to simultaneously drill the multiplicity of ball-receiving openings 29, the latter appropriately spaced around and longitudinally of the sleeve, preferably in spiral pattern, or in offset relation with respect to each other.

In a preferred procedure used in the fabrication of bearing assemblies of the present invention, each drill D is formed with a conically tapered outer end 30. The drills are advanced inwardly and radially of the retainer sleeve S a sufficient distance so that the openings 29 produced thereby will terminate in an annular ball-abutment flange 31 defining a conical ball-seating surface 32. The inner end of each of the openings 29, formed by so drilling the retainers, possesses a sufficient diameter to allow a segment of the ball element positioned therein to project beyond the inner cylindrical surface 27 of each sleeve for engagement with the outer surface of the posts 26, or other equivalent machine part, and to limit inward radial movement of the ball elements in said openings.

Following the formation of the openings 29 in the retainer sleeve, the balls 28 are deposited in the openings, preferably in a manner disclosed in our aforesaid copending application Serial No. 545,696. Thereafter, to obstruct the outer ends of the drilled openings or bores 29 of the retainer S, so as to prevent radial outward movement of the ball elements through the openings, the ball-loaded retainers are preferably forced axially through a tubular swaging die 43 (see FIG. 6), wherein the outer surface of the retainer sleeve is longitudinally grooved or swaged, as indicated at 45, by the compressing action of the die, as described in detail in our aforesaid application Serial No. 545,696. The parallel, longitudinally extending grooves or striae, thus formed are closely related so that one or more of such grooves intersects each of the openings 29. At such intersections the metal displaced by the grooving action of the die forms longitudinally projecting fins or abutments 46 which extend a sufficient distance across the end of each of the bores of openings 29 to retain the ball elements against removal from the retainer sleeve.

By reference to FIG. 6, it will be noted that the ball-receiving openings or bores 29 are each of such length that when the retainer is forced through the annular die 43, the ball elements 28 are moved inwardly of the openings 29 towards the seats 32, so as not to obstruct the swaging action and so that the ball elements are unaffected by the swaging or grooving operation. As shown in FIG. 7, when the bearing assemblies are operatively positioned in a die set, the relationship of the diameter of the ball elements 28 to the thickness of the solid cylindrical wall of the retainer sleeve is such that opposite spherical segments of the ball elements will project outwardly beyond both the inner surface 27 of the retainer and the grooved or scored outer surface 45 thereof. This relationship enables the ball elements to engage simultaneously the posts 26 and the inner surfaces of the guide bushings 24 of the die set, thereby maintaining these parts against lateral movement during relative reciprocating movement of the posts and bushings and their associated plates 22 and 23.

The invention, of course, is subject to certain modification. For example, as shown in FIG. 9, the retainer, in addition to being grooved or striated on its outer surface, may be longitudinally grooved or striated along its inner wall surface, as at 45a, to displace the material from the inner surface of the retainer and thus provide the ball-retaining projections or abutments 46a adjacent the inner ends of the ball-receiving openings 29. This grooving of the inner wall surface of the retainer thus eliminates the necessity for controlling the depth of drilling of the ball-receiving openings 29 to produce the annular shoulders or seats 32 embodied in the primary form of the invention as shown in FIGS. 4–7 of the drawings.

While the retainer sleeve is usually formed from metal, it will be understood that the construction of the present bearing assemblies is such that the retainer sleeve may readily be formed from other materials, such as a suitable synthetic resin.

In view of the foregoing, it will be seen that the present invention provides an improved tubular bearing assembly which is characterized by its relative mechanical simplicity and its ease and economy of manufacture.

While certain preferred embodiments of the present invention have been disclosed in detail, it will be understood that various modifications as to details of construction and design may be resorted to without departing from the spirit of the invention or the scope of the following claims.

Having thus described our invention, what we claim is:

1. A sleeve-like retainer for a multiplicity of antifriction bearing elements comprising an axially elongated, tubular body having relatively parallel, oppositely disposed inner and outer side wall surfaces and formed with a multiplicity of relatively spaced apart bearing-receiving pockets extending through the opposite side wall surfaces of said body, whereby to permit opposite segments of an antifriction bearing element positioned in each of said pockets to project outwardly beyond the inner and outer wall surfaces of said body, and said body being formed on at least one of its side wall surfaces with a multiplicity of closely spaced, longitudinally extending, straight, parallel grooves, each of said grooves being coextensive in length with said body and intersecting at least one of said pockets, said grooves, at the points of intersection thereof with said pockets, forming on said body integral, fin-like abutments extending partially across said pockets for retaining an antifriction bearing element therein.

2. A sleeve-like retainer as defined in claim 1, wherein both the inner and outer side wall surfaces of said body are formed with said grooves.

References Cited in the file of this patent
UNITED STATES PATENTS

| | | |
|---|---|---|
| 463,833 | Howard | Nov. 24, 1891 |
| 2,311,815 | Briney | Feb. 23, 1943 |
| 2,655,414 | Briney | Oct. 13, 1953 |